United States Patent
Slane et al.

(10) Patent No.: US 12,097,963 B2
(45) Date of Patent: Sep. 24, 2024

(54) CONTROL OF ELECTRIC PUMP-DRIVEN DEICER

(71) Applicant: Goodrich Corporation, Charlotte, NC (US)

(72) Inventors: Casey Slane, Tallmadge, OH (US); Jeffrey Martin Werbelow, Phoenix, AZ (US); Guangqing Shen, Chandler, AZ (US); Galdemir Cezar Botura, Copley, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 53 days.

(21) Appl. No.: 17/495,260

(22) Filed: Oct. 6, 2021

(65) Prior Publication Data
US 2023/0104595 A1    Apr. 6, 2023

(51) Int. Cl.
*B64D 15/22* (2006.01)
*B64D 15/16* (2006.01)

(52) U.S. Cl.
CPC ........... *B64D 15/22* (2013.01); *B64D 15/166* (2013.01)

(58) Field of Classification Search
CPC .............................. B64D 15/166; B64D 15/22
See application file for complete search history.

(56) References Cited

U.S. PATENT DOCUMENTS

| | | | | |
|---|---|---|---|---|
| 3,720,388 A | * | 3/1973 | Kaatz | B64D 15/166 244/134 A |
| 5,562,265 A | * | 10/1996 | Rauckhorst, III | B64D 15/166 244/134 A |
| 10,144,521 B2 | | 12/2018 | Deroy | |
| 2003/0122037 A1 | * | 7/2003 | Hyde | B64D 15/166 244/134 A |
| 2006/0097111 A1 | | 5/2006 | Wood et al. | |
| 2013/0284856 A1 | * | 10/2013 | Botura | B64D 15/20 244/134 F |

(Continued)

FOREIGN PATENT DOCUMENTS

| | | | | |
|---|---|---|---|---|
| CA | 3114027 | * | 10/2021 | ............. B64D 15/16 |
| CN | 107745816 A | | 3/2018 | |

(Continued)

OTHER PUBLICATIONS

Winter, Kristin. "Accumulating Knowledge: De-Ice Boots." Cessna Flyer Association (vol. 14, Issue 04, Apr. 2017) (pp. 54-57). (Year: 2017).*

(Continued)

*Primary Examiner* — Joshua J Michener
*Assistant Examiner* — Ka Chun Leung
(74) *Attorney, Agent, or Firm* — CANTOR COLBURN LLP

(57) ABSTRACT

Examples described herein provide a computer-implemented method that includes receiving static data about an aircraft. The method further includes receiving dynamic data about flight conditions for a flight of the aircraft. The method further includes determining, based on the static data and the dynamic data, an amount of air pressure and a volumetric air flow to apply from an electric pump to a deicing device. The method further includes controlling the electric pump to cause the electric pump to apply the amount of air pressure and the volumetric air flow to the deicing device.

14 Claims, 3 Drawing Sheets

(56) References Cited

U.S. PATENT DOCUMENTS

2013/0327756 A1* 12/2013 Clemen, Jr. ............ B64D 15/22
                                                         219/202
2013/0341465 A1    12/2013 Massey et al.
2018/0105277 A1    4/2018  Wiegers et al.

FOREIGN PATENT DOCUMENTS

| CN | 113148182 A    | 7/2021 |
| DE | 202004020959 U1 | 7/2006 |
| EP | 3127813 A1     | 2/2017 |
| GB | 2355243 A      | 4/2001 |

OTHER PUBLICATIONS

European Search Report Issued in European Application No. 22199661.4-1004 dated Feb. 7, 2023; 8 Pages.
European Office Action corresponding to EP Application No. 22 199 661.4; Issue Date, Jul. 5, 2024; 8 pages.

* cited by examiner

US 12,097,963 B2

CONTROL OF ELECTRIC PUMP-DRIVEN DEICER

BACKGROUND

Exemplary embodiments pertain to the art of deicers for aircraft.

Frozen precipitation (e.g., snow, ice, frost, etc.) can accumulate or form on a surface of an aircraft, which can interfere with performance and operation of the aircraft. It is therefore desirable to remove such frozen participation, which is known as deicing. Deicing can be performed, for example, chemically by applying a chemical to cause the frozen precipitation, mechanically by physically removing the frozen precipitation, thermally by causing the frozen precipitation to melt, etc.

BRIEF DESCRIPTION

Embodiments of the present invention are directed to control of electric pump-driven deicers.

A non-limiting example computer-implemented method includes receiving static data about an aircraft. The method further includes receiving dynamic data about flight conditions for a flight of the aircraft. The method further includes determining, based on the static data and the dynamic data, an amount of air pressure and a volumetric flow to apply from an electric pump to a deicing device. The method further includes controlling the electric pump to cause the electric pump to apply the amount of air pressure and the volumetric air flow to the deicing device.

In addition to one or more of the features described herein, or as an alternative, further embodiments of the method may include that the amount of air pressure is positive.

In addition to one or more of the features described herein, or as an alternative, further embodiments of the method may include that the amount of air pressure is negative, thereby creating a vacuum effect.

In addition to one or more of the features described herein, or as an alternative, further embodiments of the method may include that the static data do not change during the flight of the aircraft.

In addition to one or more of the features described herein, or as an alternative, further embodiments of the method may include that the dynamic data change during the flight of the aircraft.

In addition to one or more of the features described herein, or as an alternative, further embodiments of the method may include that the dynamic data is received in near-real-time from a sensor of the aircraft.

In addition to one or more of the features described herein, or as an alternative, further embodiments of the method may include that the amount of air pressure is based at least in part on a pressure difference between a desired pressure and an ambient pressure.

A non-limiting example controller includes a memory storing processor-executable instructions a processor to execute the processor-executable instructions to cause operations to be performed. The operations include receiving static data about an aircraft. The operations further include receiving dynamic data about flight conditions for a flight of the aircraft. The operations further include determining, based on the static data and the dynamic data, an amount of air pressure to apply from an electric pump to a deicing device. The operations further include controlling the electric pump to cause the electric pump to apply the amount of air pressure to the deicing device.

In addition to one or more of the features described herein, or as an alternative, further embodiments of the controller may include that the amount of air pressure is positive.

In addition to one or more of the features described herein, or as an alternative, further embodiments of the controller may include that the amount of air pressure is negative, thereby creating a vacuum effect.

In addition to one or more of the features described herein, or as an alternative, further embodiments of the controller may include that the static data do not change during the flight of the aircraft.

In addition to one or more of the features described herein, or as an alternative, further embodiments of the controller may include that the dynamic data change during the flight of the aircraft.

In addition to one or more of the features described herein, or as an alternative, further embodiments of the controller may include that the dynamic data is received in near-real-time from a sensor of the aircraft.

In addition to one or more of the features described herein, or as an alternative, further embodiments of the controller may include that the amount of air pressure is based at least in part on a pressure difference between a desired pressure and an ambient pressure.

A non-limiting example system includes a deicing device, an electric pump in fluid communication with the deicing device, and a controller communicatively coupled to the electric pump. The controller includes a memory storing processor-executable instructions, and a processor to execute the processor-executable instructions to cause operations to be performed. The operations include receiving static data about an aircraft. The operations further include receiving dynamic data about flight conditions for a flight of the aircraft. The operations further include determining, based on the static data and the dynamic data, an amount of air pressure to apply from the electric pump to the deicing device. The operations further include controlling the electric pump to cause the electric pump to apply the amount of air pressure to the deicing device.

In addition to one or more of the features described herein, or as an alternative, further embodiments of the system may include that the amount of air pressure is positive.

In addition to one or more of the features described herein, or as an alternative, further embodiments of the system may include that the amount of air pressure is negative, thereby creating a vacuum effect.

In addition to one or more of the features described herein, or as an alternative, further embodiments of the system may include that the static data do not change during the flight of the aircraft.

In addition to one or more of the features described herein, or as an alternative, further embodiments of the system may include that the dynamic data change during the flight of the aircraft.

In addition to one or more of the features described herein, or as an alternative, further embodiments of the system may include that the dynamic data is received at least in part from an ice detection system associated with the aircraft.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Pneumatic deicers are frozen precipitation protection devices that are positioned on critical surfaces of an aircraft susceptible to inflight frozen precipitation accretion. The pneumatic deicers can operate in one of two states: an inflated state and a deflated state. In the inflated state, the pneumatic deicers are supplied air to inflate and remove the frozen precipitation. In the deflated state, the pneumatic deicer is not actively deicing and thus is considered inactive. While in the deflated state, air is removed from pneumatic deicer to cause a vacuum to resist self-inflating phenomena and to maintain aerodynamics during flight. Traditionally pneumatic deicers are supplied air from offtake from engines ("bleed air"). However, this may not be possible in some situations, such as where electrically-powered aircraft and higher efficiency engines are implemented.

One or more embodiments described herein provide for selective deicing by controlling an electric pump-driven deicer. For example, a standalone or series of electric pump (e.g., an electric compressor/pump) are used to generate both positive pressure for inflation of a deicing device and negative pressure to create a vacuum associated with the deicing device. Conventional electric air generation solutions do not integrate smart controls that optimize air/vacuum performance based on aircraft characteristics, flight conditions, and/or operational mode. For example, as an aircraft goes through various flight and icing conditions, the vacuum and air requirements for deicing differ due to aerodynamics effects (Cp). Through analysis and test, these effects can be computed and control algorithms can be generated to control the an electric compressor's output more efficiently and accurately to supply positive or negative pressure.

The above-described aspects address the shortcomings of the prior art by varying, based on static and dynamic factors (e.g., static and dynamic data), air/vacuum performance of a deicer using an electric pump. This provides a higher efficiency and lower power solution than existing approaches. Also, using the dynamic control approach described herein, electric pumps can be operated more efficiently at a lower duty cycle helping to extend the life of the hardware/components of the deicing system. It is also possible with such capabilities that the system could be optimized based on flight conditions (e.g., dynamic data) to lead to better ice shedding performance as well, thus improving operation of the deicer and performance of the aircraft.

Figure 1:
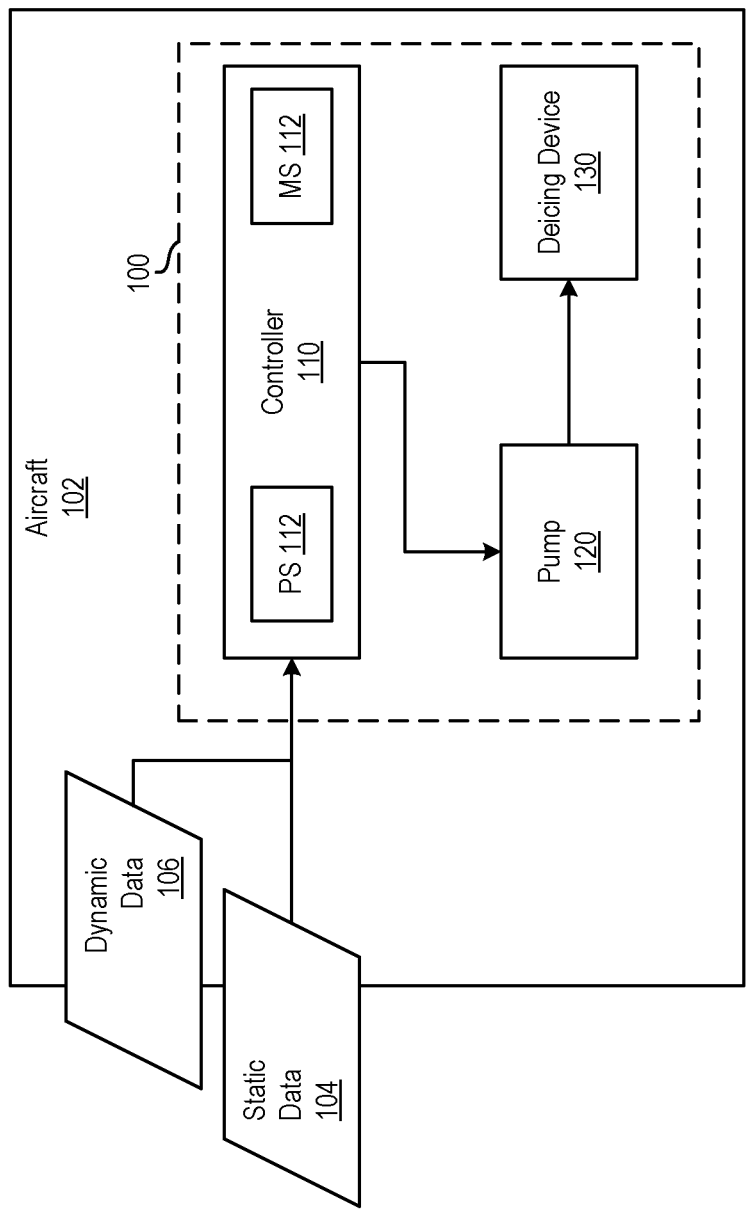
FIG. 1 depicts a block diagram of a system for selective deicing according to one or more embodiments described herein.

Turning now to FIG. 1, a system 100 for selective deicing is depicted according to one or more embodiments described herein. In this example, the system 100 includes a controller 110, a pump 120, and a deicing device 130 and is disposed in an aircraft 102.

According to one or more embodiments described herein, the pump 120 is an electrically powered pump that is electrically connected to a power source (not shown), such as a battery, to power the pump. The pump 120 can be any suitable pump for causing air or fluid to move. According to one or more embodiments described herein, the pump 120 is a compressor pump. According to one or more embodiments described herein, the pump 120 is multiple pumps, a variable speed pump, or other suitable pump for providing different amounts of air pressure.

According to one or more embodiments described herein, the deicing device 130 is a pneumatic deicer that receives positive or negative air pressure from the pump to cause the deicing device 130 to inflate (when positive air pressure is supplied) to cause deicing or to deflate (when negative air pressure is supplied). The deicing device 130 (sometimes referred to as a "deicing boot") may be installed on a surface of the aircraft 102, such as a leading edge of a wing, a control surface, etc. The deicing device 130 can include an inflatable membrane that inflates when positive pressure is supplied by the pump 120 or deflates when negative pressure (e.g., a vacuum) is supplied by the pump 120. The deicing device 130 causes the frozen precipitation to crack or otherwise breakup, and the pieces are blown away into the airflow, thus causing deicing.

The controller 110 receives data, such as static data 104 and/or dynamic data 106, and uses the received data to make a determination of when to cause the pump 120 to apply positive or negative air pressure to the deicing device 130. That is, the controller 110 implements dynamic control approach to controlling the deicing device 130.

The static data 104 includes one or more of data, characteristics, properties, etc., that typically do not change during a flight. Examples of static data 104 includes characteristics of the deicing device 130 (e.g., type, size, pressure limits, location, etc.), characteristics of the pump (e.g., type, size, maximum amount of air pressure that can be created, etc.), and other similar types of data. The static data 104 can be received from one or more systems or sensors (not shown) of the aircraft 102 and/or from a ground station (not shown). In some cases, the static data 104 is preprogrammed into the controller 110.

The dynamic data 106 includes one or more of data, characteristics, properties, etc., that typically may change during a flight. Examples of dynamic data 106 include ambient pressure, ambient temperature, aircraft altitude, aircraft velocity, and other similar types of data. The dynamic data 106 can be received from one or more systems or sensors (not shown) of the aircraft 102 and/or from a ground station (not shown).

According to one or more embodiments described herein, the controller 110 can include a processing system (PS) 112 and a memory system (MS) 114. The processing system 212 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the controller 110 can be said to include processing circuitry. The memory system 114 can store data and instructions that are executed by the processing system 112. In embodiments, the memory system 114 may include random access memory (RAM), read only memory (ROM), or other electronic, optical, magnetic, or any other computer readable medium onto which is stored data and algorithms in a non-transitory form. According to one or more embodiments described herein, the controller 110 can include other suitable components (e.g., input/output).

Figure 2:
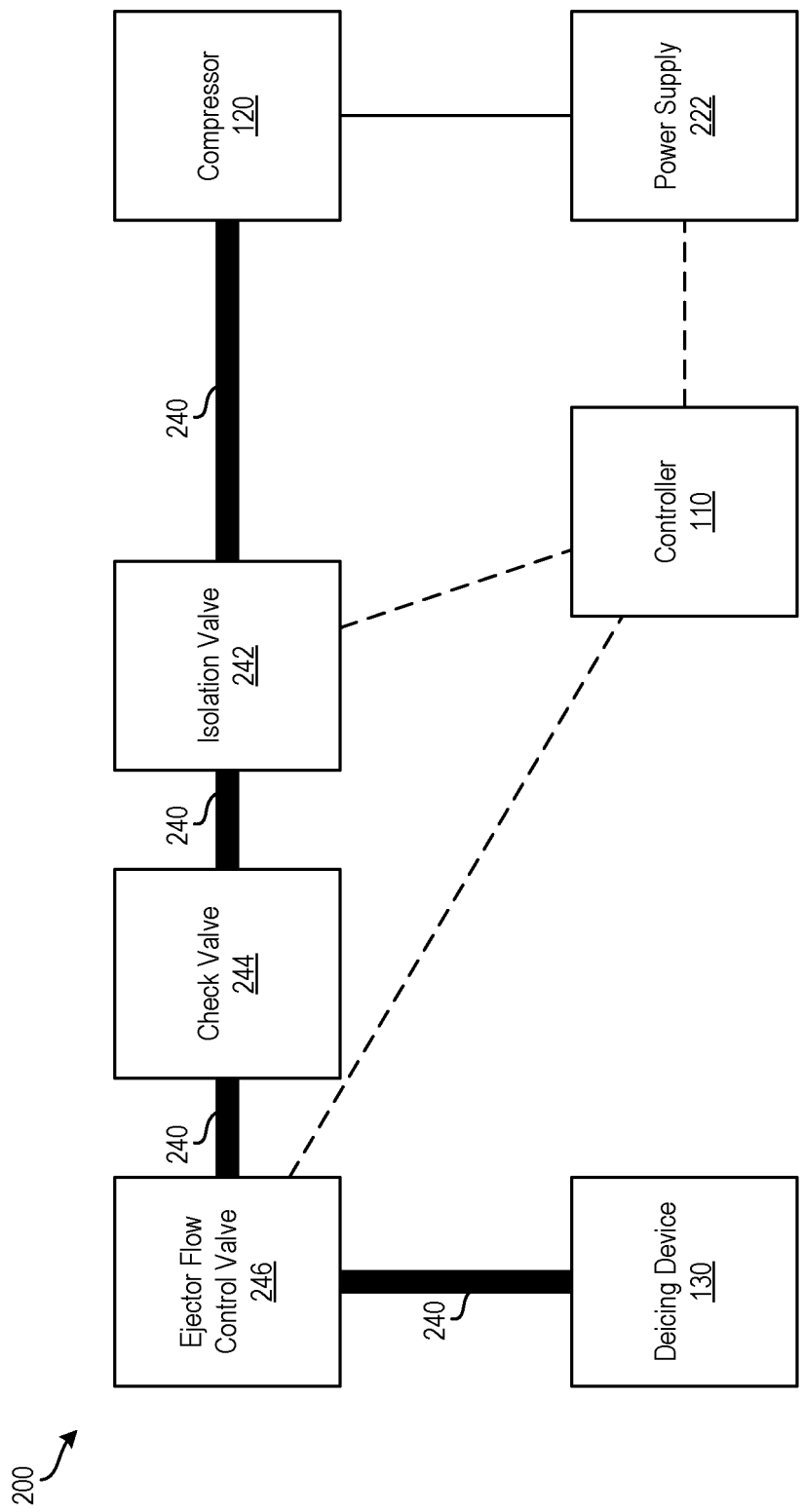
FIG. 2 depicts a block diagram of a system for selective deicing according to one or more embodiments described herein.

FIG. 2 depicts a system 200 for selective deicing according to one or more embodiments described herein. In this example, the system 200 includes the controller 110, the pump 120, and the deicing device 130. In addition, the system 200 includes a power supply 222, an isolation valve 242, a check valve 244, and an ejector flow control value 246.

The pump 120, which may be a compressor pump or other suitable pump, receives power from the power supply 222 and uses electric power to operate. In one or more examples, the power supply 222 supplies 3-phase power to the pump 120. The pump 120 is fluidly connected to the deicing device 130 by a flow passage 240. According to one or more embodiments described herein, the pump 120 receives as an input ambient air, generates positive air pressure, and supplies it to the deicing device 130 via the flow passage 240.

One or more valves may be disposed along the flow passage 240 as shown, such as the isolation valve 242, the check valve 244, and the ejector flow control valve 246. The isolation valve 242 is controllable by the controller 110 to selectively prevent the flow of air through the fluid passage 240. The check valve 242 prevents backflow of the air through the fluid passage 240. The ejector flow control valve 244 is controllable by the controller 110 to cause positive air flow to flow into the deicing device 130 or to cause air to flow out of the deicing device 130, thus creating a vacuum. For example, the ejector flow control valve 244 can be used to cause a vacuum when negative air flow is desired. When a positive air flow is desired, the ejector flow control valve 244 causes the air from the pump 120 to flow into the deicing device 130.

Figure 3:
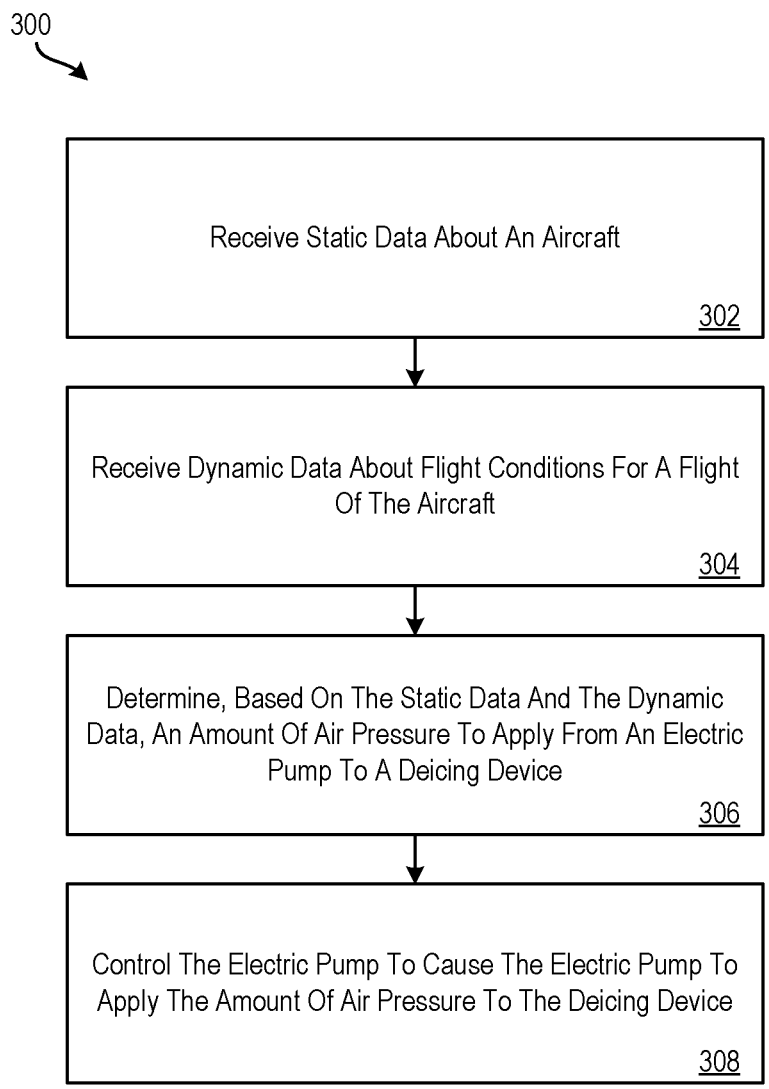
FIG. 3 depicts a flow diagram of a method for selective deicing according to one or more embodiments described herein.

FIG. 3 depicts a flow diagram of a method 300 for selective deicing according to one or more embodiments described herein. The method 300 can be implemented using the system 100 of FIG. 1 or the system 200 of FIG. 2, for example, or another suitable system or device.

At block 302, the controller 110 receives static data about the aircraft 102. The static data are data, characteristics, properties, etc. that do not change during a flight of the aircraft. At block 304, the controller 110 receives dynamic data about flight conditions for a flight of the aircraft 102. The dynamic data change during the flight of the aircraft. In some examples, the dynamic data can include data received from an ice detection system of the aircraft. The ice detection system detects icing conditions.

At block 306, the controller 110 determines, based on the static data and the dynamic data, an amount of air pressure and volumetric air flow to apply from the electric pump 120 to the deicing device 130. For example, the determination at block 306 can be based on a set of rules that indicate whether to apply positive pressure from the electric pump 120 to cause the deicing device 130 to perform deicing or whether to apply negative pressure to the deicing device 130 when deicing is not to be performed. As an example, it may be determined to perform deicing (e.g., to provide positive pressure from the electric pump 120 to the deicing device 130 to cause deicing to be performed) when the ambient temperature satisfies a temperature threshold (e.g., when the ambient temperature is below the freezing point of water). Conversely, it may be determined not to perform deicing (e.g., to provide negative pressure to the deicing device 130) when the ambient temperature does not satisfy the temperature threshold (e.g., when the ambient temperature is not below the freezing point of water). It should be appreciated that the determination at block 306 can be based on various conditions, parameters, characteristics, etc. and not merely temperature. For example, as the aircraft 102 goes through various flight and icing conditions, the deicing requirements (e.g., when to deice by supplying positive pressure to the deicing device 130 and when not to deice by supplying negative pressure to the deicing device 130) change due to aerodynamics effects. These effects are sensed in real-time or near-real-time by one or more sensors (not shown) of the aircraft, and data collected by the sensors are included in the dynamic data 106. Various different rules can be established for when to performing deicing or not (i.e., whether to supply positive pressure to the deicing device 130 or whether to supply negative pressure to the deicing device 130). In some examples, one of the rules can be to maintain a threshold difference between ambient pressure and pressure within the deicing device 130. For example, it may be desirable to maintain the threshold difference of positive pressure when deicing is performed, while it may be desirable to maintain the threshold difference of negative pressure when deicing is not performed. It should be appreciated that the threshold difference can change based on different factors, such as whether deicing is performed or not, based on the dynamic data, based on the static data, and/or based on other factors or considerations. In some examples, the determination at block 306 is made based on how deicing (or not) effects the deicing device 130. That is, when to deice and/or how much positive/negative pressure is provided to the deicing device 130 can be based on a determination to minimize the wear and tear, for example, on the deicing device 130, which improves the deicing device 130 by extending the lifespan of the deicer. The volumetric air flow provides sufficient air flow to the deicing device 130 to provide for the deicing device 130 to provide displacement for specific deicing performance.

At block 308, controls the electric pump 120 to cause the electric pump 120 to apply the amount of air pressure and volumetric air flow to the deicing device 130. This can include controlling the electric pump 120 to increase or decrease the amount of air pressure it is providing in the fluid passage 240. This can also include controlling the isolation valve 242 and/or the ejector flow control valve 246 to cause the amount of air pressure to be provided to the deicing device 130.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
   receiving static data about an aircraft;
   receiving dynamic data about flight conditions for a flight of the aircraft;
   determining, based on the static data and the dynamic data, an amount of air pressure and a volumetric air flow to apply from an electric pump to a deicing device, wherein the amount of air pressure and volumetric air flow is an amount determined to maintain a threshold difference between an ambient pressure and a pressure within the deicing device, such that the pressure within the deicing device is maintained at least the threshold difference below the ambient pressure when the pressure within a device is below the ambient pressure and such that the pressure within the deicing device is maintained at least the threshold difference above the ambient pressure when the pressure within the device is above the ambient pressure; and
   controlling the electric pump to cause the electric pump to apply the amount of air pressure and the volumetric air flow to the deicing device, wherein the amount of air pressure is negative thereby creating a vacuum effect.

2. The method of claim 1, wherein the static data do not change during the flight of the aircraft.

3. The method of claim 1, wherein the dynamic data change during the flight of the aircraft.

4. The method of claim 1, wherein the dynamic data is received in real-time from a sensor of the aircraft.

5. The method of claim 1, wherein the amount of air pressure is based at least in part on a pressure difference between a desired pressure and the ambient pressure.

6. A controller comprising:
   a memory storing processor-executable instructions; and
   a processor to execute the processor-executable instructions to cause operations to be performed, the operations comprising:
      receiving static data about an aircraft;
      receiving dynamic data about flight conditions for a flight of the aircraft;
      determining, based on the static data and the dynamic data, an amount of air pressure to apply from an electric pump to a deicing device, wherein the amount of air pressure and volumetric air flow is an amount determined to maintain a threshold difference between ambient pressure and pressure within the deicing device, such that the pressure within the deicing device is maintained at least the threshold difference below the ambient pressure when the pressure within a device is below the ambient pressure and the pressure within the deicing device is maintained at least the threshold difference above the ambient pressure when the pressure within the device is above the ambient pressure; and
      controlling the electric pump to cause the electric pump to apply the amount of air pressure to the deicing device, wherein the amount of air pressure is negative thereby creating a vacuum effect.

7. The controller of claim 6, wherein the static data do not change during the flight of the aircraft.

8. The controller of claim 6, wherein the dynamic data change during the flight of the aircraft.

9. The controller of claim 6, wherein the dynamic data is received in real-time from a sensor of the aircraft.

10. The controller of claim 6, wherein the amount of air pressure is based at least in part on a pressure difference between a desired pressure and an ambient pressure.

11. A system comprising:
    a deicing device;
    an electric pump in fluid communication with the deicing device; and
    a controller communicatively coupled to the electric pump, the controller comprising:
       a memory storing processor-executable instructions; and
       a processor to execute the processor-executable instructions to cause operations to be performed, the operations comprising:
          receiving static data about an aircraft;
          receiving dynamic data about flight conditions for a flight of the aircraft;
          determining, based on the static data and the dynamic data, an amount of air pressure to apply from the electric pump to the deicing device, wherein the amount of air pressure and volumetric air flow is an amount determined to maintain a threshold difference between an ambient pressure and a pressure within the deicing device, such that the pressure within the deicing device is maintained at least the threshold difference below the ambient pressure when the pressure within a device is below the ambient pressure and the pressure within the deicing device is maintained at least the threshold difference above the ambient pressure when the pressure within the device is above the ambient pressure; and
          controlling the electric pump to cause the electric pump to apply the amount of air pressure to the deicing device, wherein the amount of air pressure is negative thereby creating a vacuum effect.

12. The system of claim 11, wherein the static data do not change during the flight of the aircraft.

13. The system of claim 11, wherein the dynamic data change during the flight of the aircraft.

14. The system of claim 11, wherein the dynamic data is received at least in part from an ice detection system associated with the aircraft.

* * * * *